(12) United States Patent
Chen et al.

(10) Patent No.: US 6,366,629 B1
(45) Date of Patent: Apr. 2, 2002

(54) METHOD OF ESTIMATING TIMING PHASE AND RATE OFFSETS IN DIGITAL DATA

(75) Inventors: Xiaofen Chen, West Linn; Thomas L. Kuntz, Portland, both of OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/185,421

(22) Filed: Nov. 3, 1998

(51) Int. Cl.$^7$ .............................. H04L 7/00; H04N 5/38
(52) U.S. Cl. ................................... 375/355; 348/21
(58) Field of Search .............................. 375/355, 354, 375/357, 373, 376, 150, 152; 348/433, 434, 21, 479

(56) References Cited

U.S. PATENT DOCUMENTS

| | | | |
|---|---|---|---|
| 5,416,524 A | | 5/1995 | Citta et al. |
| 5,619,269 A | * | 4/1997 | Lee et al. .................... 348/432 |
| 5,982,819 A | * | 11/1999 | Womack et al. ............ 375/316 |
| 5,987,070 A | * | 11/1999 | Fimoff et al. ............... 375/286 |

OTHER PUBLICATIONS

"VSB Modulation Used for Terrestrial and Cable Broadcasts" by Gary Sgrignoli, Wayne Bretl, Richard Citta.

* cited by examiner

*Primary Examiner*—Chi Pham
*Assistant Examiner*—Khai Tran
(74) *Attorney, Agent, or Firm*—William K. Bucher; Francis I. Gray

(57) ABSTRACT

A method of estimating symbol timing phase and rate offsets of a sampled digitally modulated signal having repetitive symbol sync sequences includes the steps of estimating symbol sync sequence locations in a block of signal samples using a cross-correlation with a reference pattern of ideal symbol sync sequences. Signal samples within subranges defining the symbol sync sequences in the block of signal samples are filtered for removing intersymbol interference. An iterative process of cross-correlation of the filtered signal samples within the subranges using the reference pattern of ideal symbol sync sequences and an ideal symbol sync correction pattern generates timing phase and rate offset values that are used to derive filter coefficients for resampling the filtered signal samples within the subranges using an interpolating filter. The rate offset value is derived using a linear model and performing an optimal estimation. The iterative cross-correlation and resampling process continues until the rate of change of timing phase and rate offset values are minimized. The timing phase and rate offset values are provided to a resampling FIR filter for generating properly synchronized signal samples that are time aligned to symbol-spaced boundaries.

18 Claims, 9 Drawing Sheets

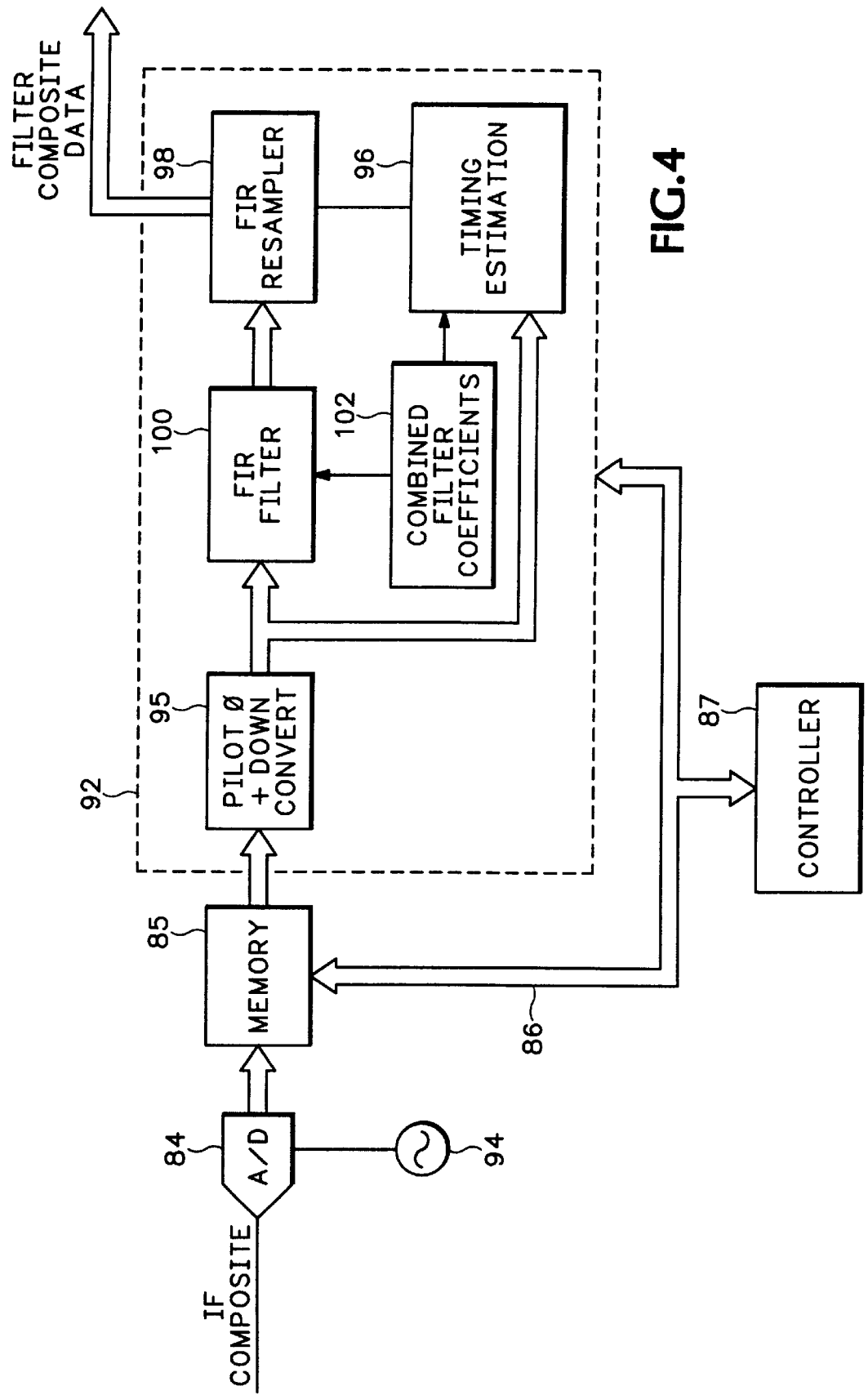

METHOD OF ESTIMATING TIMING PHASE AND RATE OFFSETS IN DIGITAL DATA

BACKGROUND OF THE INVENTION

The present invention relates generally to a method of time aligning symbol data in a digitally modulated transmission system and more specifically to estimating symbol timing phase and rate offsets of a sampled digitally modulated signal having repetitive symbol sync sequences, such as 8-VSB digital television signals.

The Federal Communications Commission has adopted the Digital Television Standard developed by the Advanced Television Systems Committee (ATSC). The Digital Television Standard is designed to transmit high quality video, audio and ancillary data over a 6 MHz channel. The Standard describes the channel coding and modulation RF/transmission subsystems for terrestrial and cable applications. The modulation subsystem uses a digital data stream to modulate the transmitted signal and may be implemented in two modes: a terrestrial broadcast mode (8-VSB) delivering about 19 Mbps, and a higher data rate mode (16-VSB) delivering about 38 Mbps for cable televisionvystems where higher signal to noise is ensured.

The modulation technique implemented in the Digital Television Standard was developed by Zenith Corp. and employs vestigial sideband modulation. The overall system response of the transmitter and receiver filtering corresponds to a raised cosine filter to avoid system generated intersymbol interference. The system response is implemented with serially coupled, nominally identical root raised cosine filters in the transmitter and in the receiver.

The incoming digital data stream is randomized, forward-error-correction (FEC) encoded and interleaved. The randomized, FEC coded and interleaved data is trellis encoded as an 8-level (3-bit) one dimensional constellation. The outputs of the trellis coder are mapped into symbols that are one of eight symmetric odd-valued integer levels from −7 to +7 units. To aid synchronization in low signal to noise and/or high multipath situations, segment and field syncs are inserted in the 10.76 Msymbols/sec symbol stream. A small pilot tone is added as well at the carrier frequency generated by offsetting the real or I channel of the complex signal containing the data and the sync pulses by 1.25 units. The offset causes the pilot tone to be in-phase with the I channel signal component. At the transmitter, the composite signal passes through a root raised cosine filter and modulates an intermediate frequency carrier signal which is up-converted to an RF frequency for transmission at the desired channel frequency. Alternately, the composite signal may be used to directly modulate the RF carrier.

Referring to FIG. 1, there is shown a representative block diagram of a VSB receiver for extracting the digital television signal data from the digitally modulated RF signal as described in the "Guide to the Use of the ATSC Digital Television Standard" published by the ATSC. The receiver 10 receives the UHF or VHF signal through a band-pass filter and broadband tracking filter 12. A wideband amplifier 14 increases the signal level and couples it to a first mixer 16. The mixer is driven by a 1st local oscillator 18 that tunes over a range from 978 to 1723 MHz. The 1 st local oscillator 18 is synthesized by a phase locked-loop and controlled by a microprocessor (not shown). The output of the mixer 16 is an up-converted intermediate frequency (IF) signal at 920 MHz. The IF signal is coupled to an LC filter 20 in tandem with a band-pass ceramic resonator filter 22 centered at 921 MHz. An IF amplifier 24 is placed between the two filters.

The IF signal is coupled to a second mixer 26 that is driven by 2nd local oscillator 28. The 2nd local oscillator 28 is an 876 MHZ voltage controlled SAW oscillator controlled by a frequency and phase-locked loop (FPLL) synchronous detector 30. The output of the second mixer 26 is centered at 45 MHz. This IF signal drives a constant gain 44 MHZ amplifier 32. The output of the amplifier 32 is coupled to an IF SAW filter 34. The IF SAW filter 34 implements an approximation of the transmission system's root raised cosine filter at the receiver. The output of the SAW filter 34 is coupled to the FPLL synchronous detection circuitry 30 via an AGC controlled amplifier 36.

Carrier recovery is performed on the pilot signal by the FPLL circuit 30. The operation of this circuit is described in U.S. Pat. No. 4,091,410, assigned to Zenith Corp. The configuration provides a Phase Locked Loop (PLL) function with a very wide pull-in range which insures rapid carrier acquisition. The I channel baseband data signal from the synchronous detector 30 is coupled through a low pass filter 54 to an analog-to-digital converter (A/D) 56 that is clocked by a properly phased 10.76 MHz symbol clock 58. The digital data from the A/D converter 56 is coupled to a data segment sync detector 60 having a narrow bandwidth filter for detecting from the synchronously detected random data the repetitive data segment syncs as described in U.S. Pat. No. 5,416,524, assigned to Zenith Corp. The symbol clock generator 58 free runs at a rate reasonably close to the transmitted symbol clock prior to phase locking. The data segment sync detector 60, containing a 4-symbol sync correlator 62, looks for the sync symbols occurring at the specified sync repetition rate. The output of the correlator is integrated using a segment delay line 64, with only the syncs rising to a high level, since all the other data is guaranteed to be random in nature. The clock frequency need not be locked to find the segment sync in order to recognize the segment sync. Clock phasing begins when a sync detector/confidence counter 66 reaches a predefined level indicating that the segment sync has been found. The sync detector signal from the sync detector/confidence counter 66 samples a quadrature filter 68 output during the sync time in a sampler/phase detector 70, producing an error voltage proportional to the phase difference between the receiver's clock sampling time and the zero crossing of the quadrature filter 68 output, which corresponds to a maximum eye opening. The 4-tap quadrature filter 68 converts the segment syncs into "discriminator S-curve" signals. The sampler 70 output is coupled through an APC low pass filter 72 for adjusting the symbol clock generator 58 either higher or lower in frequency, until the proper sampling time is reached, with the symbol clock locked to the incoming data clock frequency.

A Hewlett-Packard HP 89440A Vector Signal Analyzer has been used for making measurements on 8-VSB signals. The HP 89440A includes a superheterodyne receiver having a first LO and mixer for up-converting the incoming signal to a first IF frequency. Second and third LOs and mixers respectively generate second and third IF frequencies of 40 MHz and 10 MHz. The 10 MHz IF is digitized by an analog-to-digital converter with the digitized data being down converted to baseband real and imaginary data. The real and imaginary data values are passed to a digital signal processor for FFT conversion and additional signal processing. A limitation of a superheterodyne type receiver is the need for bandwidth limiting filters between the IF stages to prevent the undesired mixer signal outputs from entering subsequent IF stages. Such filtering can mask artifacts in the transmitter signal resulting in inaccurate measurements of the operating condition.

In certain applications, such as measurements of the signal quality, a software based demodulator could be used to demodulate the received IF signal. A software based demodulator can bring greater flexibility in processing the digitally modulated signal. For example, in some measurements, it is desirable to limit the amount of signal filtering to prevent the masking of desirable characteristics in the signal. This would include narrow band-limiting filters in the IF signal. channel and the transmission system's receiver filter. In other cases the demodulator has to provide signal samples representative of the digitally modulated transmitter signal that have been filtered with the transmission system's receiver filter. This type of flexibility may be achieved by employing a signal processing section having an unfiltered hardware acquisition front end and a software based demodulator. The software demodulator can generate signal samples that have and have not been filtered by the transmission system's receiver filter so signal quality comparisons can be made between the different signal samples. Additionally, it can provide flexible demodulation design for adapting to the needs of different types of measurements. The incoming signal should be sampled at a rate sufficient to prevent aliasing in the software demodulator and to provide the signal samples necessary to make certain types of measurements, such as an eye diagram display. As with all demodulators, accurate timing alignment is important to recover the transmitted digital symbols, but it is especially important for accurately measuring signal quality. For software based demodulators, there is an additional need to provide a computationally efficient timing alignment method, which is not addressed in prior art hardware based demodulators.

SUMMARY OF THE INVENTION

Accordingly, an object of the present invention is deriving symbol timing phase and rate offsets in a sampled digitally modulated signal having repetitive symbol sync sequences wherein the signal samples have not been filtered by the system's receiver filter.

Another object of the present invention is improving system processing throughput by reducing filter processing of the signal samples of the digitally modulated signal for deriving symbol timing phase and rate offsets.

A further object of the present invention is establishing an efficient and accurate method of estimating the rate offset of the symbol sync sequences in a digitally modulated signal having repetitive symbol sync sequences.

The present invention is a method of estimating symbol timing phase and rate offsets in signal samples having repetitive symbol sync sequences representative of the digitally modulated radio frequency signal generated by a transmission system having a transmitter and a receiver with an overall system response implemented with serially coupled transmitter and receiver filters for avoiding system generated intersymbol interference and machine readable medium having stored thereon a series of instructions, which when executed by a processor of a transmission receiver, estimates the symbol timing phase and rate offset in the signal samples. The method and instructions include the steps of processing the signal samples for producing filtered signal samples within selected subranges of a block of the signal samples containing the symbol sync sequences and generating symbol timing phase and rate offset values using the filtered signal samples in the selected subranges. The filtered signal samples are resampled in the selected subranges using an interpolating filter having filter coefficients derived from the symbol timing phase and rate offset values and the generating and resampling steps are repeated with the generating step calculating updated symbol timing phase and rate offset values from the resampled filtered signal samples for deriving updated filter coefficients for the resampling process until a limit value is reached. The generating step further includes the additional steps of determining incremental changes in the timing phase offset values and a count on the number of times the generating step is performed and returning the current calculated timing phase and rate offset values when the incremental changes are reduced to or below selected values or when the genrateing stop count exceeds a selected value.

System processing throughput improves by correlating the block of signal samples with a reference pattern of ideal symbol sync sequences for determining a location of a peak cross-correlation value for estimating locations of the symbol sync sequences in the block of signal samples and filtering the signal samples in the selected subranges about the estimated symbol sync sequence locations using a transmission system receiver filter. The filtered signal samples for the subranges are stored in a buffer memory.

The generation of the timing phase offset value includes the steps of correlating the signal samples of the subranges with the reference pattern of ideal symbol sync sequences for determining a correlation peak location and correlating the signal samples of the subranges with a reference pattern of quadrature symbol sync sequences for determining the symbol timing phase offset value. The generation of the timing rate offset values includes the step of correlating each subrange of signal samples with the reference pattern of the quadrature symbol sync sequences for determining the symbol timing rate offset value.

The correlating step for the timing phase offset value includes the steps of calculating parameters of a line segment having a zero crossing using data values from the correlation of the signal samples of the subranges and the reference pattern of quadrature symbol sync sequences that includes the quadrature correlation data value corresponding to the correlation peak location determined with the reference pattern of ideal symbol sync sequences and estimating a horizontal distance from the smallest quadrature correlation data value to the line segment zero crossing point for use as the symbol timing phase offset update value.

The correlating step for the timing rate offset value includes the step of modeling a rate offset from individual timing rate offsets for each subrange using a linear model. The modeling step includes the steps of determining weighting values of a least-squares fit linear model based on the number of segments in the block of signal samples and estimating the symbol timing rate offset update value with a summation process using the weighting values and zero lag data values from each of the correlations of the subrange of signal samples with the quadrature sync symbol pattern.

The generating of the timing phase and rate offset values includes the calculating step of combining the current symbol timing phase and rate offset values with previous symbol timing phase and rate offset values. The resampling step further includes the step of filtering the signal samples of the subranges using a fractional-delay FIR filter implemented by a Lagrange interpolating polynomial.

The objects, advantages and novel features of the present invention are apparent from the following detailed description when read in conjunction with the appended claims and attached drawings.

BRIEF DESCRIPTION OF THE DRAWINGS

FIG. 4 is a block diagram of a portion of a software demodulator incorporating the method of estimating symbol timing phase and rate offset according to the present invention.

DETAILED DESCRIPTION OF THE PREFERRED EMBODIMENT

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Part of the description will be presented in terms of operations performed by a computer system, using terms such as data, values, signal samples, flags, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined and otherwise manipulated through mechanical and electrical components of the computer system; and the term computer system includes general purpose as well as special purpose data processing machines, systems, and the like, that are stand alone, adjunct or embedded.

Additionally, various operations will be described as multiple discrete steps in turn in a manner that is most helpful in understanding the present invention. However, the order of description should not be construed as to imply that these operations are necessarily order dependent, in particular, the order of their presentation.

Figure 1:
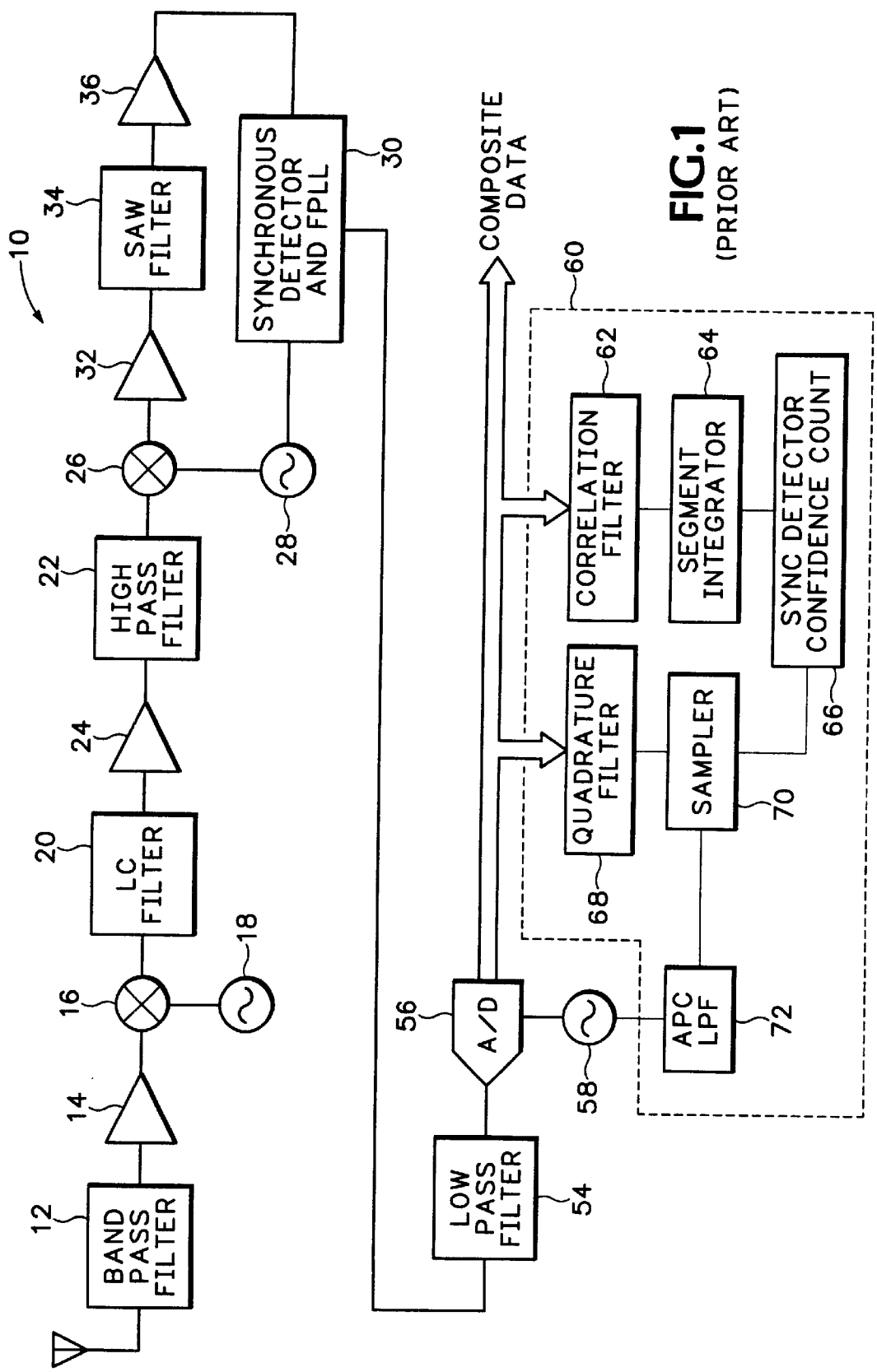
FIG. 1 is a block diagram of a prior art digital signal sampling system using a sync detector in a portion of a signal processing receiver for 8-VSB digital television.
Figure 2:
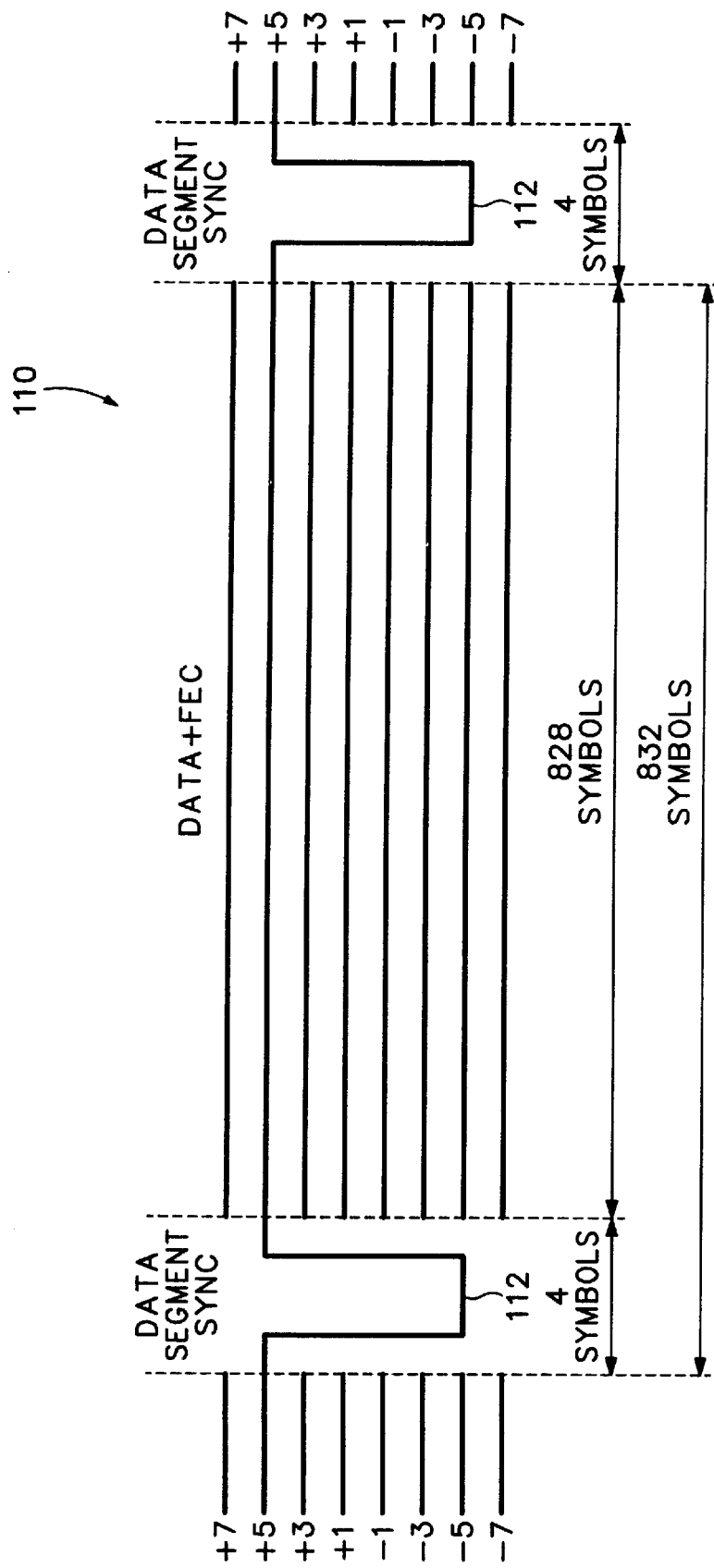
FIG. 2 is a simplified representation of the symbol stream which may be encoded as an 8-VSB digital television signal usable with the method of estimating symbol timing phase and rate offset according to the present invention.

The present invention will be described in relation to the terrestrial 8-VSB digital television signal having an RF carrier modulated by a 10.762 Msymbols/sec digital modulation signal. The digital modulation signal contains data and forward error correction symbols as well as data segment syncs as shown in the representative diagram of a trellis-coded 8-VSB baseband data segment format 110 in FIG. 2. The trellis-coded data has eight evenly spaced odd-valued signal levels from −7 to +7. Each data segment has 832 symbols starting with a data segment sync sequence 112 having a +5, −5, −5, +5 symbol pattern and is followed by 828 symbols containing data symbols and forward error correction symbols. 313 data segments make-up a data field with two fields making-up a frame of video information. The timing phase and rate offset estimating method of the present invention is not limited to an 8-VSB signal and other types of digitally modulated signals having a similar repeating symbol sequence may be processed using the present invention.

Figure 3:
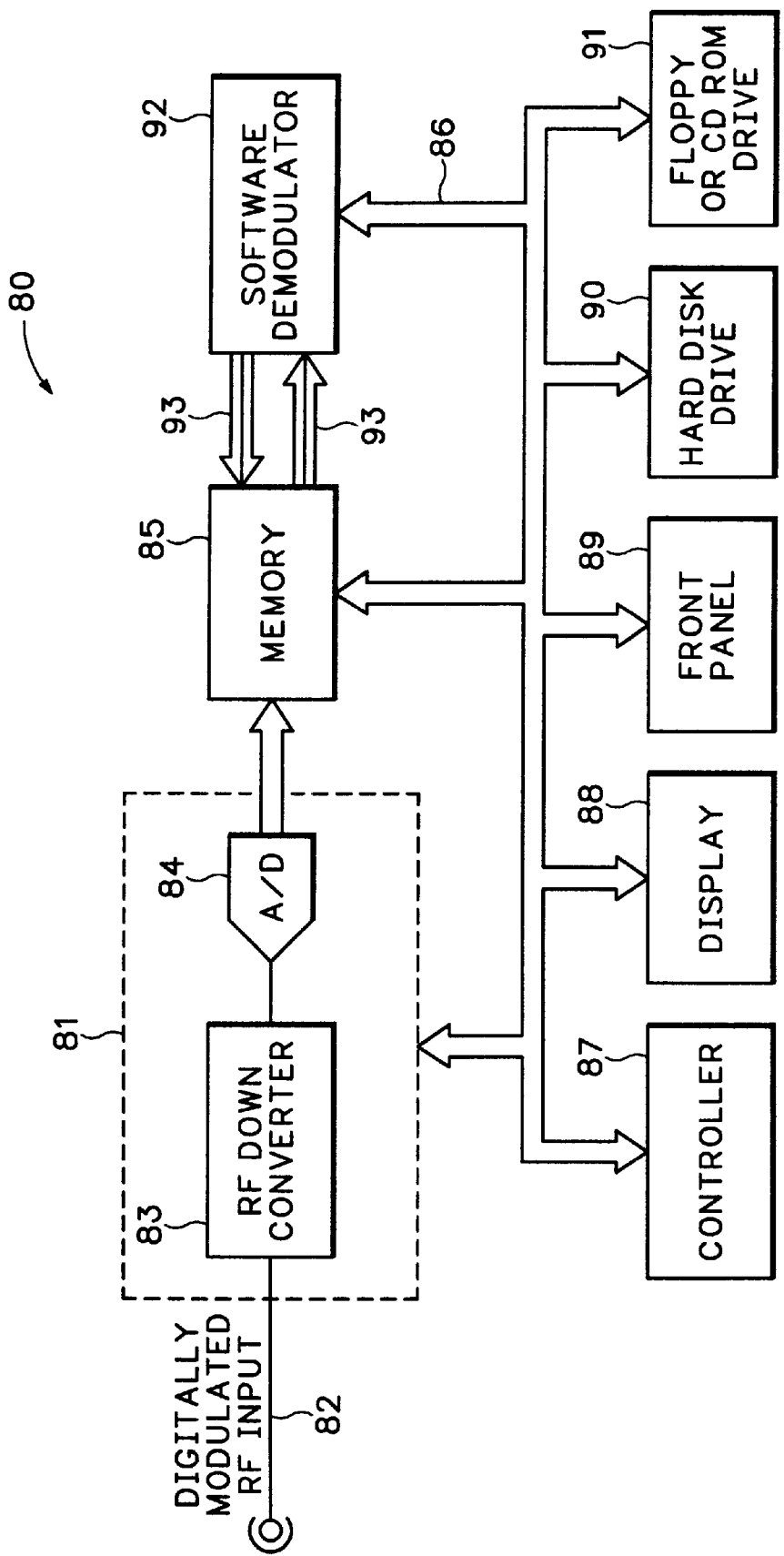
FIG. 3 is a block diagram illustrative of a transmission receiver system incorporating the method of estimating symbol timing phase and rate offset according to the present invention.

FIG. 3 shows a representative block diagram of a transmission system receiver 80, as could be used in a measurement instrument, digital television receiver or the like. The transmission system receiver 80 includes a hardware front end 81 receiving a digitally modulated RF input signal 82. The RF signal 82 is down converted to a digitally modulated intermediate frequency (IF) signal by RF hardware down converter circuitry 83 that generally includes of one or more mixers in the IF signal path. Each mixer is driven by a local oscillator. An analog-to-digital (A/D) converter 84 receives the digitally modulated IF signal and converts the signal to digital data values that are stored in memory 85. Memory 85 includes both RAM, ROM and cache memory with the RAM memory storing volatile data, such as the data values representative of the IF signal and the like. A data and control bus 86 couples memory 85 to a controller 87, such as PENTIUM® microprocessor, manufactured and sold by Intel, Corp., Santa Clara, Calif. The data and control bus 86 may also be coupled to the front end hardware 81, a display device 88, such a liquid crystal display, cathode ray tube or the like, a front panel 89, a data storage device, such as a hard disk drive 90, and floppy and/or CD ROM drive(s) 91. A software demodulator 92 is representatively shown connected to the bus 86 and coupled to memory 85. The software demodulator 92 executes various processes that are performed by the controller 87 using processing routines stored in memory 85 including program instructions performing the estimation of symbol timing and rate offsets functions shown in the accompanying figures. Data flow lines 93 connect the memory 85 with the software demodulator 92 for showing the movement of data from the memory 85 to the software demodulation process and back. The program instructions may be stored and accessed from the ROM memory 85, the hard disk drive 90 or a removable medium, such as a floppy disk or CD ROM, read from the floppy disk or CD ROM drive(s) 91. The transmission system receiver 80 in the preferred embodiment of the invention is a PC-based system controlled under WIN- DOWS® 95 operating system, manufactured and sold by Microsoft, Corp., Redmond, WA.

Referring to FIG. 4, there is shown a portion of the software demodulator 92 implementing the method of estimating symbol timing phase and rate offsets according to the present invention. The demodulator 92 executes various processes that are performed by the controller 87 using processing routines stored in memory 85 or accessed from the hard disk drive 90 or the floppy or CD ROM drive 91, as representatively shown by blocks 95, 96, 98 and 100 in the figure. The lines interconnecting the blocks 95, 96, 98, 100 represent the data flow in the demodulating process. For the purposes of visualizing the demodulator 92, the data and control bus 86 is shown connecting the demodulator 92 to the controller 87 and memory 85.

The analog-to-digital (A/D) converter 84 receives the 8-VSB digitally modulated intermediate frequency (IF) signal at its input. In the preferred embodiment of the present invention, the IF carrier frequency is 10.762 MHz and the digital modulation on the IF carrier is at 10.762 Msymbols/sec. The A/D converter 84 is clocked by a signal generated by a sample clock generator 94. The digitally modulated IF carrier is sampled at a minimum of twice the highest frequency of the signal of interest to prevent aliasing of the data in the demodulator 92. In the preferred embodiment of the present invention, the digitally modulated IF carrier is sampled at four times the IF carrier frequency. The signal samples representing the IF carrier and signal are stored in memory 85 and are accessed by the microprocessor 87.

In the preferred embodiment, the signal samples representing the digitized IF signal are down converted to baseband data prior to performing the timing phase and rate offset estimation process. Any phase shift of the carrier or pilot tone needs to be estimated and removed from the data. A pilot phase estimator and down converter processing block 95 estimates the pilot tone phase in the IF signal and uses the phase angle in a complex mnxing operation to down convert the digital data to baseband. The down converted samples are stored in memory 85. The pilot phase estimator and down converter process is described in co-pending patent application Ser. No. 09/185,218, filed Nos, 3,2081 and assigned to the assignee of the instant application.

The block of signal samples stored in memory 85 is processed by the timing estimation process 96 that generates timing phase and rate offset values. The timing and filter. The time estimation process 96 and the FIR filter 100 receive filter coefficients 102 that correspond to frequency domain response of a root raised cosine function with compensation for linear magnitude and phase deviations of the receiver front end hardware. Output from the FIR resampling filter 98 are signal samples that are time aligned to the symbol timing.

As previously described, the prior art uses hardware circuitry for implementing the transmission system's receiver filter, sync detection and locking the symbol clock to the data clock frequency. In the present invention, the transmission system's receiver filter 100 for reducing intersymbol interference is implemented as part of the software demodulator 92. Implementing such a software filter results in a relatively large amount of computational time to pass the complete signal sample set through the filter 100 as compared to the hardware implemented filter. In addition, the computational time is further increased because of the sampling rate of four times the symbol frequency. In the present invention, intersymbol interference includes the interference associated with not properly filtering the RF signal with the transmission system's receiver filter as well as sum terms from the down conversion and channel distortions. The timing phase and rate offset estimation method of the present invention uses the symbol sync sequences in the signal samples for determining the timing phase and rate offsets of the signal samples. Innovative processing solutions are employed to reduce filter processing by doing an initial search on the block of signal samples for synchronization, then selectively filtering only small portions of the original larger block of signal samples. An additional innovative solution uses a short interpolating filter for fractional-delay resampling, versus a longer, traditional polyphase FIR design. A further innovative solution uses a linear model for determining the timing rate offset. The signal is modeled as a linear system with unknown timing phase and rate offsets. The solution of the system of equations, using Least Square analysis, provides an efficient and accurate method of estimating the timing rate offset of the signal.

In the preferred embodiment of the present invention, the input to the timing estimation process 96 consists of complex signal samples (I+jQ) at a nominal rate of four times the symbol rate. It is assumed that the signal samples are at 0 Hz IF (i.e. baseband samples) and that the in-phase or data-bearing component of the signal is contained in the real part of the complex signal samples. The sampling instance may be at any arbitrary timing phase within the symbol interval (phase offset) and may slew with respect to symbol timing across the data set by several samples (rate offset). Additionally, the signal samples need to contain properly spaced Data Segment Sync (DSS) sequences as defined in the ATSC specification. The data block length needs to be large enough to contain several segment sync sequences within the block of signal samples to be processed. The block of signal samples used in the commercial implementation of the present invention has approximately 73,000 samples spanning 22 segment sync sequences. The number of segment sync sequences contained in the block of signal samples was arbitrarily chosen for good performance and reasonable throughput and a smaller or a larger number of segment syncs may be chosen without departing from the scope of the appended claims so long as the number chosen provides sufficient samples for performing the timing phase and rate offset determinations.

Figure 5A:
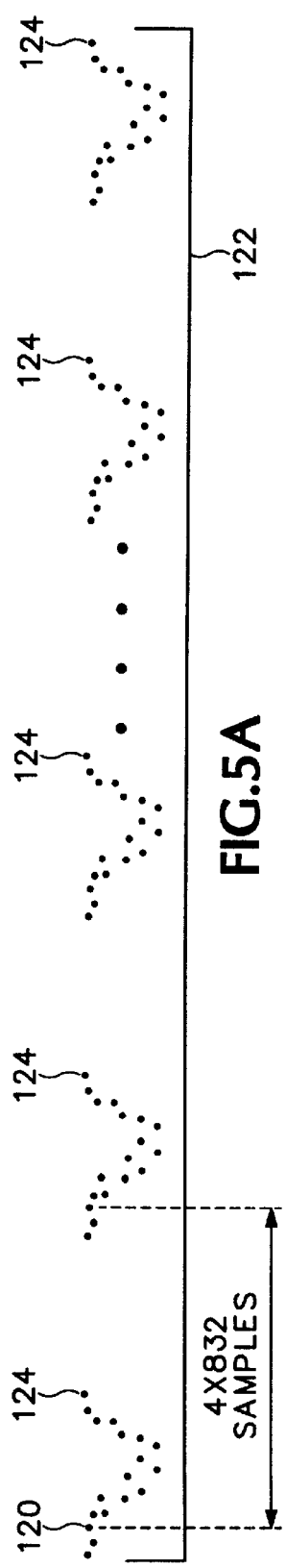
FIG. 5A is a representative diagram of signal samples of repetitive symbol sync sequences having intersymbol interference used in the method of estimating symbol timing phase and rate offset according to the present invention.
Figure 5B:
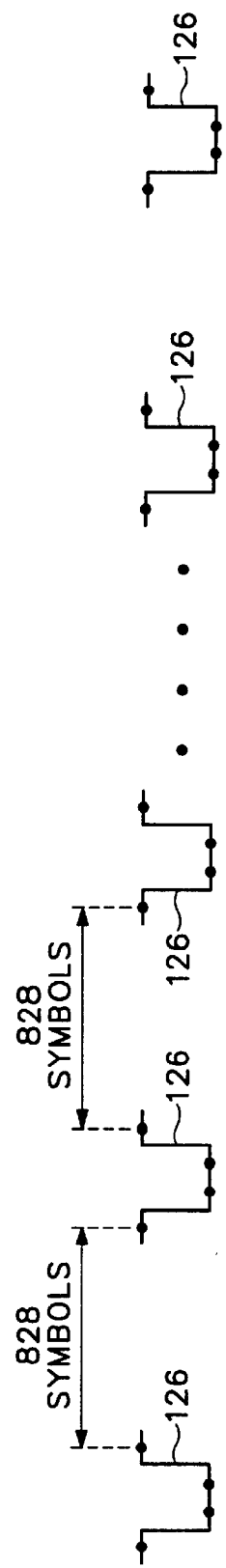
FIG. 5B is a representative diagram of a reference pattern of ideal symbol sync sequences used in the method of estimating symbol timing phase and rate offset according to the present invention.

An initial search for the positions of the segment sync sequences within the block of signal samples is performed. The search is a cross correlation of the real or "I" part of the signal samples having intersymbol interference as represented in FIG. 5A with a reference pattern of ideal segment sync sequences as is represented in FIG. 5B. The correlation runs through a delay window or range slightly larger than one data segment in signal sample increments to find a peak cross-correlation value and a lag index. In the preferred embodiment of the present invention, the correlation range equals 3,408 signal samples or 852 symbols. The cross-correlation process is represented by the following equation:

$$R_{sD}(\tau) = \sum_{n=0}^{N-1} \sum_{k=0}^{3} Re[s(\tau + Sn + 4k)] \cdot DSS(k) \tag{1}$$

$$\tau = \tau_1, \tau_1 + 1, \ldots \tau_1 + S + \tau_2$$

where $R_{sD}(.)$ is the cross-correlation at delay $\tau$, $\tau$ is the delay index in sample intervals, N is the number of segments within the block of signal samples, S is the expected number of samples between data segment sync sequences (4×832), s() is the received signal sample set, DSS() is the ideal 4-point segment sync sequence, $\tau_1$ is the initial delay index value, and $\tau_2$ is the number of additional sample intervals to extend the delay range beyond one segment length.

Referring to FIG. 5A, an initial starting or reference point $\tau_1$ 120 is set within the block of signal samples, represented by region labeled 122, as one-half of the length of the filter corresponding to the root raised cosine and correction response plus 40 digital data sampling points. The waveform of FIG. 5A shows the signal samples of the symbol sync sequences 124 having a distorted pattern caused by effects of intersymbol interference and other distortions in the system. With a sampling rate of four times the symbol rate, there are 3328 signal samples between the start of each symbol sync sequence 124. The correlation lag range starts at the initial value and covers a total of 3408 signal samples or 852 symbols. The reference pattern of FIG. 5B may be visualized as a sequence of 20 ideal symbol sync patterns 126 each having a +5, −5, −5, +5 symbol pattern and separated by 828 symbols or 3312 signal samples.

Figure 6B:
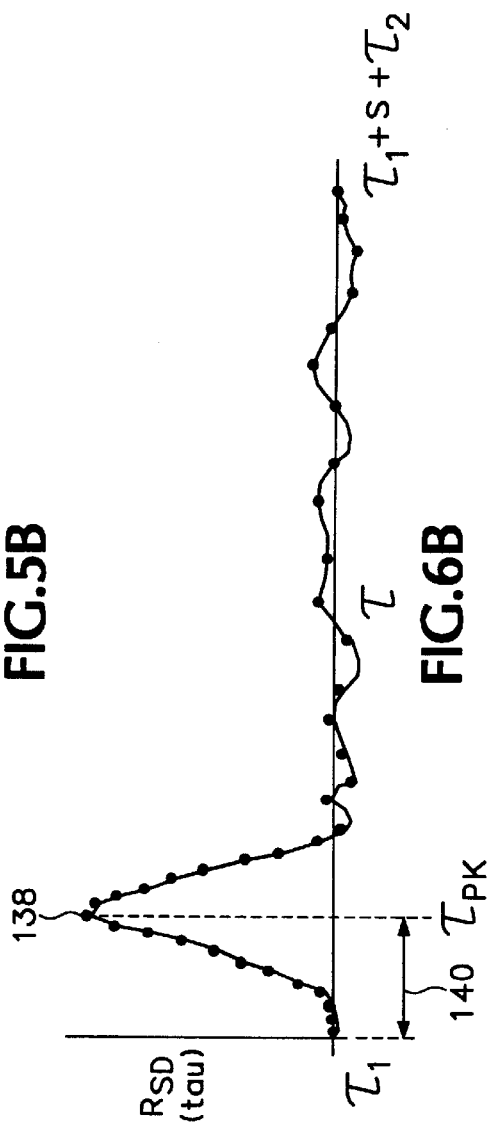
FIGS. 6A and 6B are respective representations of the cross-correlation process and the resulting data used in the method of estimating symbol timing phase and rate offset according to the present invention.
Figure 6A:
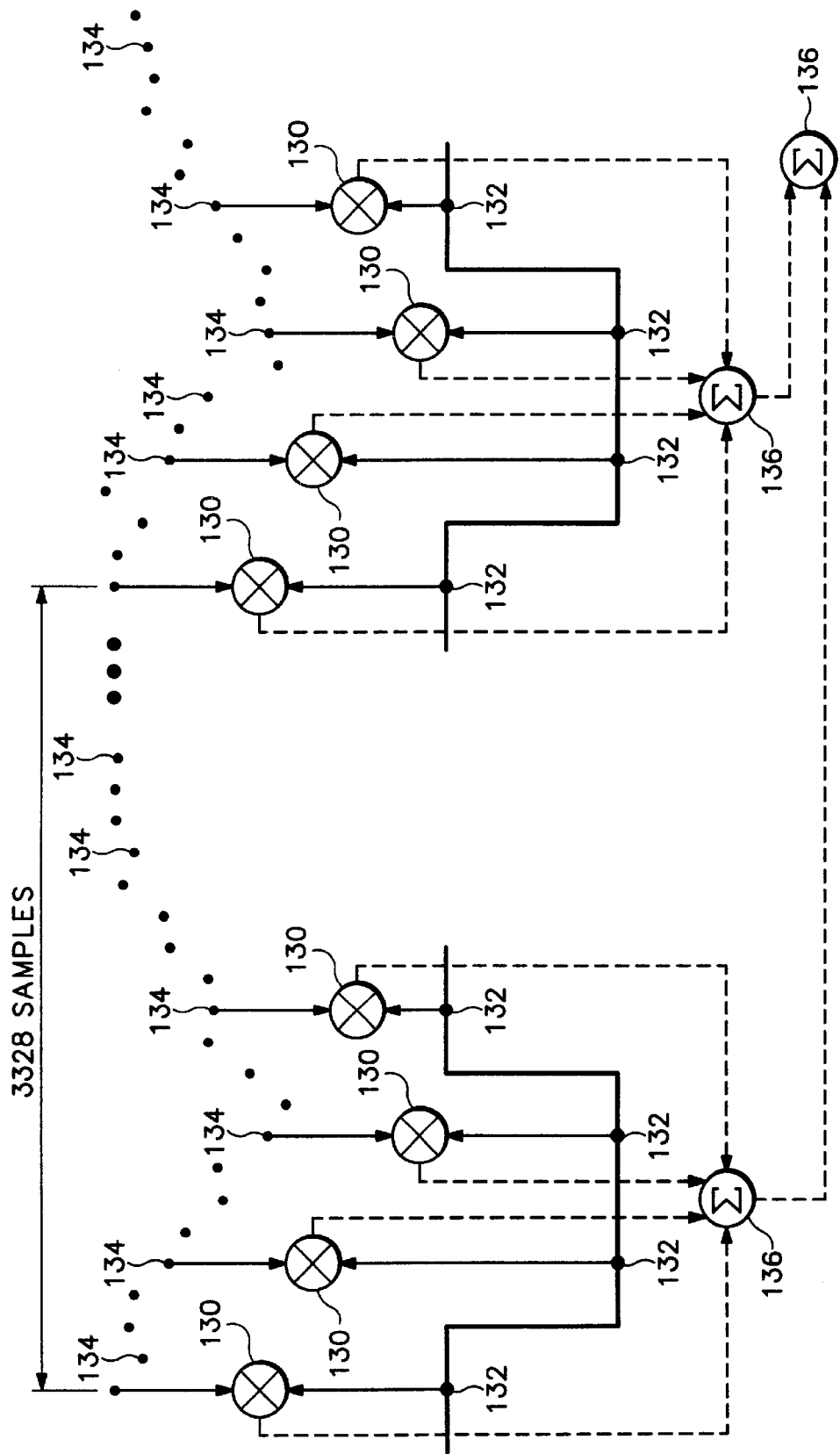

As representatively shown in FIG. 6A, the cross-correlation function is performed by multiplying 130 each reference symbol 132 of the 20 symbol sync sequences of the reference pattern with a corresponding signal sample point 134 in the block of signal samples 122 and summing 136 the multiplied results for each sample point together to obtain a R(τ) value. This process is repeated for each signal sample point 134 in the correlation range set to produce a set of data having a correlation peak value when the reference pattern of ideal segment sync sequences 126 is aligned with the received segment sync sequences 124 in the block of signal samples 122. FIG. 6B is a graphical representation of the results of the cross-correlation function showing the cross-correlation peak 138. The location of the correlation peak is taken as the approximate position of the symbol sync sequences 124 in the block of signal samples 122. The lag index $\tau_{pk}$ of the peak correlation is the initial estimate of the timing phase of the symbol sync sequences within the block of signal samples.

$$\tau_{pk} = arg\left[\max_{\tau} R_{SD}(\tau)\right] \quad (2)$$

Knowing the starting point l in the correlation range within the block of signal samples and the lag index of $\tau_{pk}$ along with a knowledge that the symbol sync sequence spacing is 3328 signal samples or 832 symbols, the approximate center locations of each of the symbol sync sequences 124 in the block of signal samples 122 are determined.

The cross-correlation process is performed in a computationally efficient manner by normalizing the reference pattern of ideal segment sync sequences to values of +1, −1, −1, +1. This results in simply inverting the signs of the middle two signal samples in the correlation process. This allows a straight forward summation of the samples without the need for performing the multiplication of the ideal pattern with the real signal samples.

The block of signal samples are reduced for further processing by establishing narrow subranges of signal samples corresponding to a few symbol intervals surrounding the peak correlation lag position $\tau_{pk}$ and subsequent segment spacings ($\tau_{pk}$+Sk) through the block of signal samples. Each subrange includes a symbol sync sequence 124 and a few symbol intervals around the sequence. In the preferred embodiment, there are 8 symbol intervals in each subrange equaling 32 signal samples. A complex filtering operation utilizing the transmission system's receiver filter (root raised cosine filter in the preferred embodiment) and compensation FIR filter coefficients $h_{RF}(n)$ 102 is applied to the signal sample subranges as shown by the below equation.

$$s_{RF}(k,n) = Re[s(S \cdot k + n + m) \otimes_{RF}(m)] \quad (3)$$

$$k = (0, 1, \ldots N-1), (\tau_{pk} - \delta) \leq n \leq (\tau_{pk} + \delta)$$

Using the subranges around the symbol sync sequence locations produces a reduction in the filtering requirements of approximately 100 to 1, since only about 8 of the 832 symbol intervals per segment need to be filtered by the transmission system's receiver filter. Also, only the real-part of the complex-data/complex-coefficient filter result is needed, which also reduces the filtering processing by half The filtered signal samples are stored in a static buffer for reuse through the remainder of the timing estimation process. Appropriate compensation is made during the filtering process to account for the time delay of the filtering process to avoid shifting the cross-correlation peak.

The final steps in the timing estimation process consist of an iterative process to refine the timing phase and rate offsets based on the filtered subrange signal samples. The steps include repeatedly resampling the static buffer of filtered signal samples, and deriving an error quantity from the resampled signal samples which is used to drive the iteration process toward a minimum error, or deviation, from ideal symbol instances. During each iteration, the timing phase and rate offset values of the resampling process are modified to converge on the final values of the resampling timing phase and rate offset which cause the resampled signal to minimize the error measure. Resampling is performed over the subranges of filtered signal samples surrounding the symbol sync sequences. Resampling over the subranges significantly reduces the number of resampling operations as compared to resampling over the entire block of signal samples.

Figure 7A:
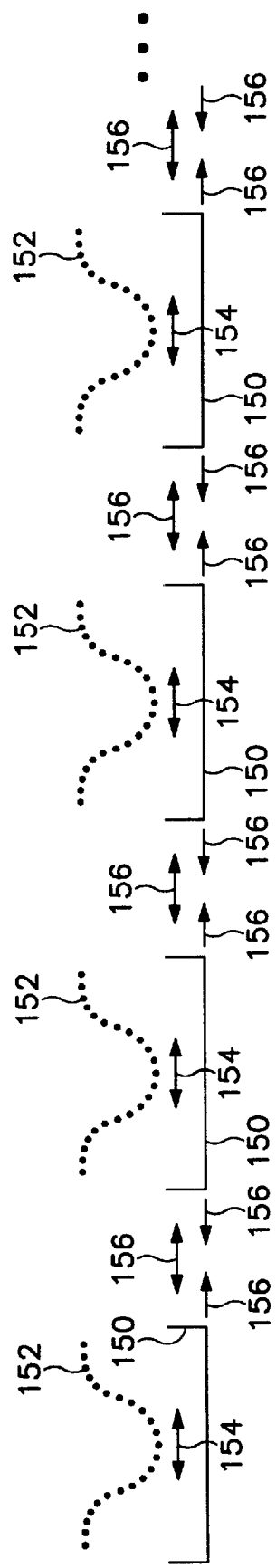
FIGS. 7A, 7B and 7C are respective representative diagrams of subranges containing filtered signal samples of the symbol sync sequences, a reference pattern of ideal symbol sync sequences and a reference pattern of quadrature symbol sync sequences used in the method of estimating symbol timing phase and rate offset according to the present invention.
Figure 7B:
Figure 7C:

Referring to FIG. 7A, there is shown a representation of the filtered signal samples in subranges 150 containing the symbol sync sequences 152. The timing phase offset value may be viewed as varying the symbol sync sequences within the subranges as represented by arrowed lines 154. The timing rate offset value may be viewed as varying the subranges within the block of signal samples as represented by arrowed lines 156. The iteration process includes cross-correlation with the reference pattern of ideal symbol sync sequences 158, as represented in FIG. 7B, to generate a correlation peak. A second cross-correlation is performed to generate an error curve by correlating the subrange signal samples with a reference waveform matching the subranges having a symbol sequence pattern 160 of −5, −5, +5, +5, as represented in FIG. 7C. This pattern has been referred to as representing a quadrature filter in 8-VSB literature and this nomenclature will be used for calling the pattern a quadrature segment sync (QSS) symbol pattern. The QSS cross-correlation produces an "S"-shaped error curve, with the zero-crossing of the S-curve at the optimum lag time for symbol timing. The goal of the iteration process is to use the error curve information to drive the timing phase offset toward a value which causes a resampling delay in the resampling filter to place the QSS cross-correlation zero crossing very near a sample point.

Figure 8A:
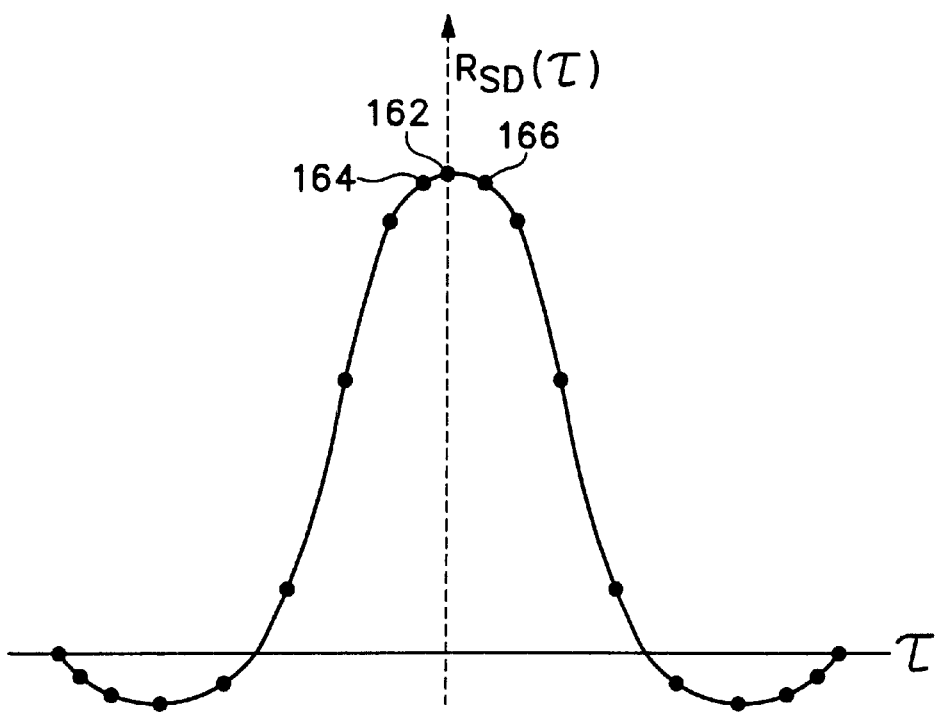
FIGS. 8A and 8B are respective representative diagrams of the cross-correlation results for estimating the timing phase offset in the method of estimating symbol timing phase and rate offset according to the present invention.
Figure 8B:
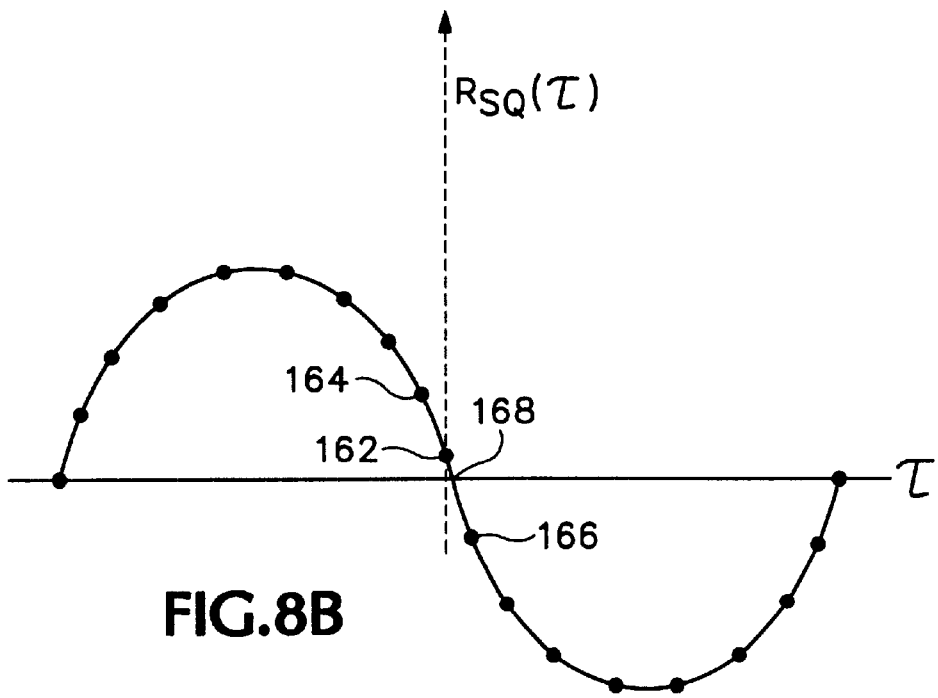
Figure 9:
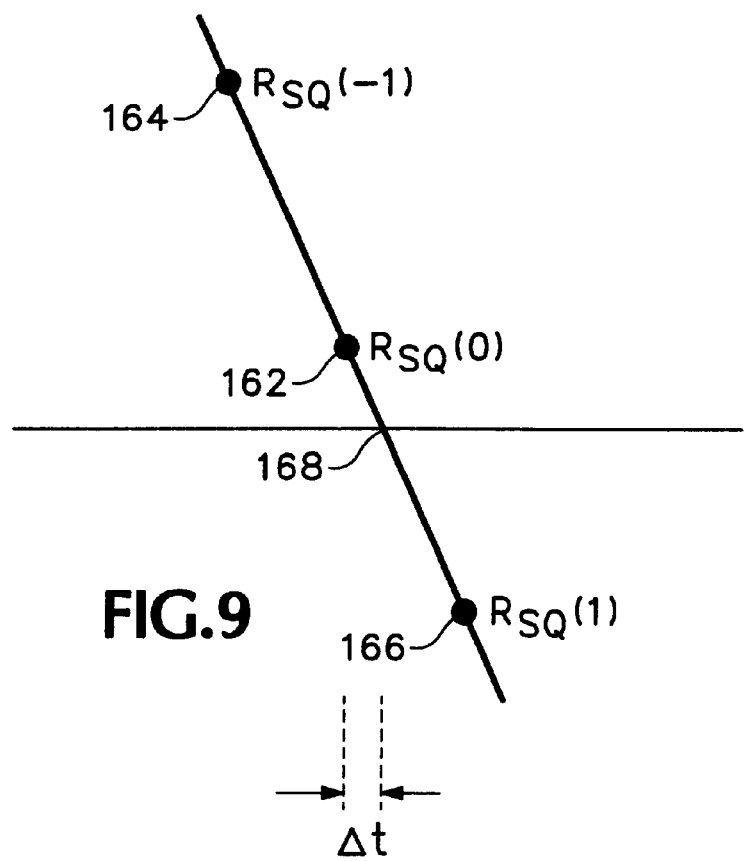
FIG. 9 is a graphical representation of the timing phase offset value generation process in the method of estimating symbol timing phase and rate offset according to the present invention.

FIGS. 8A and 8B are representative waveform drawings of the respective cross-correlation results using the reference pattern of ideal symbol sync sequences and the quadrature segment sync symbol pattern. The cross-correlation results are obtained using the same process previously described for estimating the location of the symbol sync sequences. The quadrature segment sync cross-correlation is computed at the lag delay corresponding to the symbol sync sequence correlation peak 162 and the +/−1 sample intervals 164 and 166 around it. Depending on the current resampling delay versus the ideal delay, the center point 162 nearest the zero crossing 168 will be a small positive or negative value, while the outer points 164 and 166 are large positive and negative values. The center value 162 determines the position of the zero-crossing 168. If the center value 162 is positive, as shown more clearly in FIG. 9, the zero crossing 168 is between the center 162 and the last or late sample 166. If the center value 162 is negative, the zero crossing 166 is between the first or early sample 164 and center sample 162. The amount of timing phase update $\Delta t$ needed to be added to or subtracted from the current timing phase offset value $T_{off}$ is computed by finding the zero crossing point 168 of a straight line between the two quadrature segment sync correlation values, separated by a sample interval, which bracket the zero-crossing. In the drawing of FIG. 9, the straight line is computed between the correlation values 162 and 166. If the center point 162 were negative the correlation values would be between correlation values 162 and 164. The equation below represents the computational process for determining the timing phase offset update value $\Delta t$ for each iteration:

$$\Delta t = \begin{cases} R_{sQ}(0)/(R_{sQ}(1) - R_{sQ}(0)) & R_{sQ}(0) > 0 \\ R_{sQ}(0)/(R_{sQ}(0) - R_{sQ}(-1)) & R_{sQ}(0) < 0 \end{cases} \quad (4)$$

where $R_{sQ}(n)$ is the QSS cross-correlation value at lag=n samples relative to the symbol sync sequence correlation peak. The timing phase offset update value $\Delta t$ is added to the accumulated timing phase offset value $T_{off}$ to produce a new $T_{off}$ value having less error than the previous $T_{off}$ value.

$$T_{off} = T_{off} + \Delta t \quad (5)$$

A timing rate offset $F_{off}$ is updated using the quadrature segment sync cross-correlation to estimate the rate of change of the zero-crossing positions. A rate offset is modeled from individual timing rate offsets for each subrange using a linear model. In the preferred embodiment, the quadrature segment sync cross-correlation is computed for each of the symbol sync sequences, then a weighting factor is applied which is derived from a Least-Square fit to model the zero crossing of each segment sync by a linear function (an unknown constant and rate). The solution of the Least-Squares equation provides the timing rate offset update value:

$$\Delta f = 1/S \cdot \sum_{k=0}^{N-1} W_{LS,rate}(k) \cdot R_{sQ,k}(0) \quad (6)$$

$$W_{LS,rate}(k) = ((k+1) \cdot N - C_1)/(N \cdot C_2 - C_1^2) \quad k=(0, \ldots N-1) \quad (7)$$

$$C_1 = \sum_{n=1}^{N} n \quad (8)$$

$$C_2 = \sum_{n=1}^{N} n^2 \quad (9)$$

where $R_{sQ,k}(0)$ is the 0-lag QSS cross-correlation of the k-th segment symbol sync sequence, N is the number of segments, and the factor 1/S scales the rate to samples/sample units. It should be noted that the weighting values depend on the number of segments in the data block of signal samples, so these values need to be computed once, then saved for subsequent use.

Figure 10:
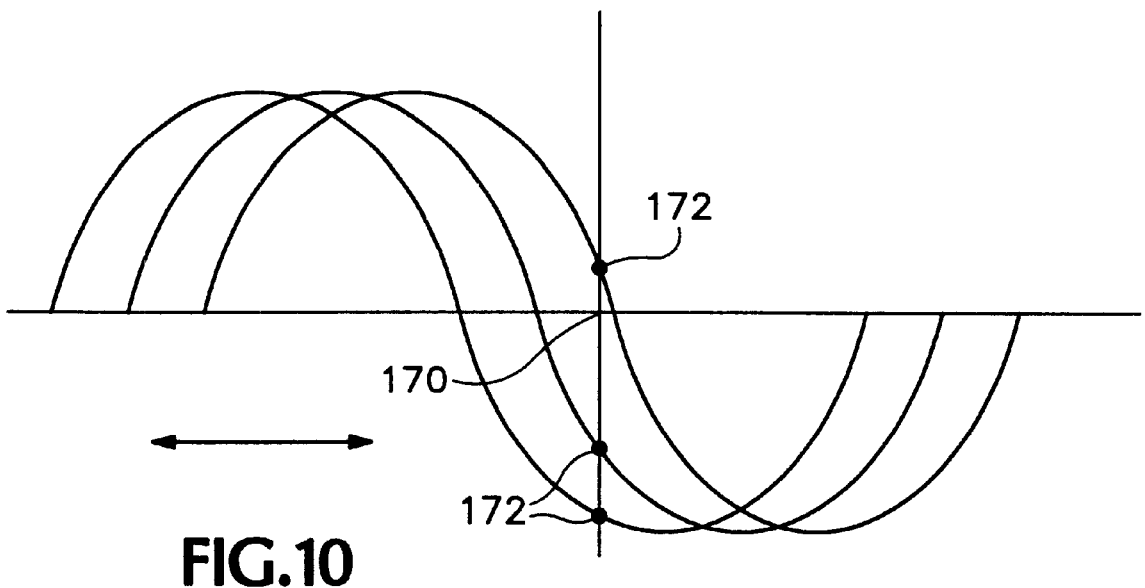
FIG. 10 is a graphical representation of the quadrature segment syncs cross-correlation values in the timing rate offset value generation process in the method of estimating symbol timing phase and rate offset according to the present invention.

FIG. 10 is a graphical representation of the quadrature segment syncs cross-correlation values in the timing rate offset process. If there is no timing rate slewing of the symbol sync sequences, the quadrature segment sync cross-correlations for each symbol sync sequence overlap each other at the zero crossing point 170. If the timing rate is faster than the nominal rate (i.e. the rate of the quadrature symbol sync sequence), then the 0-lag cross-correlations will decrease in value across the sample block, as shown in FIG. 10, and if the timing rate is slower than the nominal value, then the 0-lag cross-correlations will increase in value across the sample block. The summation of products of the 0-lag crossings 172 of the quadrature symbol sync sequence cross-correlation and the weighting factors times the scaling factor provides the timing rate offset update value $\Delta f$ The timing rate offset update value $\Delta f$ times a gain factor $K_1$ is added to the accumulated timing rate offset value $F_{off}$ to produce a new $F_{off}$ value having less error than the previous $F_{off}$ value.

$$F_{off} = F_{off} + K_1 \cdot \Delta f \quad (10)$$

$K_1$ is adjusted to damp out noise in the $\Delta f$ values while allowing reasonably fast convergence to the final value of $F_{off}$.

During each iteration, resampling is performed on the filtered signal samples to correct the current estimated timing phase and rate offset values, $T_{off}$ and $F_{off}$. The amount of delay D introduced by the resampling process varies from iteration to iteration as the feedback process modifies the estimates of timing phase and rate offset values in the subrange signal sample sets. The amount of delay may also increase or decrease across the subrange signal sample sets to account for the timing rate offset value $F_{off}$.

During an iteration, a delay value $D_k$ is computed for each subrange of signal samples surrounding each symbol sync sequence. $D_k$ can be assumed to be a constant over the short subrange interval for moderate amounts of rate offset.

$$D_k = T_{off} + F_{off} \cdot S \cdot k \quad k=[0,1,\ldots N-1] \quad (11)$$

where $T_{off}$ and $F_{off}$ are the current estimated timing phase and rate offset values, respectively.

The resampling process is accomplished using a 3rd-order (4-point) Lagrange interpolation polynomial, which can be used as a fractional delay FIR filter. The filter is defined as:

$$H_D(z) = h_0(D) + h_1(D) \cdot z^{-1} + h_2(D) \cdot z^{-2} + h_3(D) \cdot z^{-3} \quad (12)$$

$$h_0(D) = -(D-1) \cdot (D-2) \cdot (D-3)/6 \quad (13)$$

$$h_1(D) = D \cdot (D-2) \cdot (D-3)/2 \quad (14)$$

$$h_2(D) = -D \cdot (D-1) \cdot (D-3)/2 \quad (15)$$

$$h_3(D) = D \cdot (D-1) \cdot (D-2)/6 \quad (16)$$

$$h_D(M) = Z^{-1}[H_D(z)] \quad (17)$$

where D is the fractional (group) delay of the filter, in sample intervals. This is an approximation to the ideal fractional-delay filter $H_{D,ideal}(z)=z^{-D}$.

$D_k$ is used to compute the filter coefficients $h_{Dk}(z)$ for filtered signal sample subranges k, and the filter is applied to those signal samples. This produces a set of filtered, time-adjusted signal samples for the current iteration.

$$s_{resampled}(k,n)=s_{RF}(S\cdot k+n+m) \otimes h_{Dk}(m) \qquad (18)$$

$$k=[0,1,\ldots N-1], (\tau_{pk}-\delta)\leq n \leq (\tau_{pk}+\delta)$$

The iteration process is repeated with the new values of $T_{off}$ and $F_{off}$ until a threshold value is reached. This threshold may be a preset number of iterations, an amplitude value related to the zerocrossing point or that the amount of change in $T_{off}$ over several iteration becomes insignificant. In the preferred embodiment of the present invention, the rate of change of $T_{off}$ and a maximum number of iterations threshold is used. The rate of change is based on a sequence of decreasing rate changes over previous iterations. For example, if the current $T_{off}(n)$ is within 0.01% of the previous $T_{off}(n-1)$, and that $T_{off}(n-1)$ is within 0.02% of the previous $T_{off}(n-2)$ and that $T_{off}(n-2)$ is within 0.03% of the previous two $T_{off}(n-3)$, $T_{off}(n4)$ where n denotes the iteration time index, then the iteration is considered to have minimized the timing phase and rate offsets. If the maximum iteration threshold is exceeded prior to rate of change in the $T_{off}$ threshold being reached, the iteration process is terminated and the process returns the values of $T_{off}$ and $F_{off}$ as the results of the timing estimation process, which are applied to resampling FIR filter process 98 for producing properly synchronized signal samples.

The above described estimating of symbol timing phase and rate offsets has been described as a series of instructions executed by a processor of a transmission system receiver on signal samples stored in a memory. The elements and structure implementing the symbol timing phase and rate offsets method of the present invention may equally be implemented using hardware circuitry. The elements may implemented as discrete filters, logic circuits and delay lines. Alternatively, the elements may be implemented in one or more application specific integrated circuit (ASIC) device(s) or a combination of discrete circuit elements and ASIC device(s).

A method has been described for estimating symbol timing phase and rate offsets of a sampled digitally modulated signal having repetitive symbol sync sequences where the digitally modulated signal contains intersymbol interference. The method allows the generation of properly synchronized signal samples that traditionally have been generated using a phase locked sampling system. The steps of the timing phase and rate offset estimation process include estimating symbol sync sequence locations in a block of raw down converted signal samples; filtering selected subranges of the block of signal samples about the estimated symbol sync sequence locations; generating timing phase and rate offset values; resampling the selected subranges using an interpolating filter having filter coefficients derived from the timing phase and rate offset values; and repeating the resampling and timing phase and rate offset values generating steps for calculating updated timing phase and rate offset values for the resampling process until the rate of change of the timing phase offset value reaches a selected value. A pattern of ideal symbol sync sequences and quadrature symbol sync sequences are used for deriving timing phase and rate update values for each iteration of the resampling process. The iterative process of updating the timing phase and rate offset values and resampling the filtered signal samples in the subranges drives the process toward a minimum error for the offsets.

It will be obvious to those having skill in the art that many changes may be made to the details of the above-described embodiment of this invention without departing from the underlying principles thereof The scope of the present invention should, therefore, be determined only by the following claims.

What is claimed is:

1. A method of estimating symbol timing phase and rate offsets in signal samples having repetitive symbol sync sequences representative of a digitally modulated radio frequency signal generated by a transmission system having a transmitter and a receiver with an overall system response implemented with serially coupled transmitter and receiver filters for avoiding system generated intersymbol interference, comprising the steps of:
   (a) processing the signal samples for producing filtered signal samples within selected subranges of a block of the signal samples containing the symbol sync sequences;
   (b) generating symbol timing phase and rate offset values using the filtered signal samples in the selected subranges;
   (c) resampling the filtered signal samples in the selected subranges using an interpolating filter having filter coefficients derived from the symbol timing phase and rate offset values; and
   (d) repeating steps (b) and (c) with the generating step calculating updated symbol timing phase and rate offset values from the resampled filtered signal samples for deriving updated filter coefficients for the resampling process until a limit value is reached.

2. The method of estimating symbol timing and rate offsets as recited in claim 1 wherein the processing step further comprises the steps of:
   (a) correlating the block of signal samples with a reference pattern of ideal symbol sync sequences for determining a location of a peak cross-correlation value for estimating locations of the symbol sync sequences in the block of signal samples;
   (b) filtering the signal samples in the selected subranges about the estimated symbol sync sequence locations using a transmission system receiver filter; and
   (c) storing the filtered signal samples for the subranges in a buffer memory.

3. The method of estimating symbol timing and rate offsets as recited in claim 1 wherein the generating step further comprises the steps of:
   (a) correlating the signal samples of the subranges with a reference pattern of ideal symbol sync sequences for determining a correlation peak location;
   (b) correlating the signal samples of the subranges with a reference pattern of quadrature symbol sync sequences for determining the symbol timing phase offset value; and
   (c) correlating each subrange of signal samples with the reference pattern of the quadrature symbol sync sequences for determining the symbol timing rate offset value.

4. The method of estimating symbol timing and rate offsets as recited in claim 3 wherein the correlating step (b) further comprises the steps of:
   (a) calculating parameters of a line segment having a horizontal-axis zero-crossing using data values from the correlation of the signal samples of the subranges and the reference pattern of quadrature symbol sync sequences that includes the quadrature correlation data value corresponding to the correlation peak location in correlation step (a); and (b) estimating a horizontal distance from the smallest quadrature correlation data value to the horizontal-axis zero crossing for use as the symbol timing phase offset value.

5. The method of estimating symbol timing and rate offsets as recited in claim 3 wherein the correlating step (c) further comprises the step of modeling a rate offset from individual timing rate offsets for each subrange using a linear model.

6. The method of estimating symbol timing and rate offsets as recited in claim 5 wherein the modeling step further comprises the steps of:

(a) determining weighting values of a least-squares fit linear model based on a number of segments in the block of signal samples; and (b) estimating the symbol timing rate offset value with a summation process using the weighting values and zero lag data values from each of the correlations of the subrange of signal samples with the quadrature sync symbol pattern.

7. The method of estimating symbol timing and rate offsets as recited in claim 1 wherein the calculating step for symbol timing phase and rate offsets values further comprises the step of combining the current symbol timing phase and rate offset values with previous symbol timing phase and rate offset values.

8. The method of estimating symbol timing and rate offsets as recited in claim 1 wherein the generating step further includes the additional steps of:

a) determining incremental changes in the timing phase offset values and a count on the number of times the generating step is performed; and b) returning the current calculated timing phase and rate offset values when the incremental changes are reduced to selected values or the generating step repetition count exceeds a selected value.

9. The method of estimating symbol timing and rate offsets as recited in claim 1 wherein the resampling step further comprises the step of filtering the signal samples of the subranges using a fractional-delay FIR filter derived from a Lagrange interpolating polynomial.

10. A machine-readable medium having stored thereon a series of instructions which, when executed by a processor of a transmission system receiver, estimates symbol timing phase and rate offsets in signal samples having repetitive symbol sync sequences representative of a digitally modulated radio frequency signal generated by a transmission system having a transmitter and a receiver with an overall system response implemented with serially coupled transmitter and receiver filters for avoiding system generated intersymbol interference by causing the processor to:

(a) process the signal samples for producing filtered signal samples within selected subranges of a block of the signal samples containing the symbol sync sequences;

(b) generate symbol timing phase and rate offset values using the filtered signal samples in the selected subranges;

(c) resample the filtered signal samples in the selected subranges using an interpolating filter having filter coefficients derived from the symbol timing phase and rate offset values; and (d) repeat steps (b) and (c) with the generating step calculating updated symbol timing phase and rate offset values from the resampled filtered signal samples for deriving updated filter coefficients for the resampling process until a limit value is reached.

11. The machine readable medium as recited in claim 10 wherein the instructions for processing the signal samples further comprise instructions which, when executed by the processor, causes the processor to:

(a) correlate the block of signal samples with a reference pattern of ideal symbol sync sequences for determining a location of a peak cross-correlation value for estimating locations of the symbol sync sequences in the block of signal samples;

(b) filter the signal samples in the selected subranges about the estimated symbol sync sequence locations using a transmission system receiver filter; and (c) store the filtered signal samples for the subranges in a buffer memory.

12. The machine readable medium as recited in claim 10 wherein the instructions for generating the symbol timing phase and rate offset values further comprise instructions which, when executed by the processor, causes the processor to:

(a) correlate the signal samples of the subranges with a reference pattern of ideal symbol sync sequences for determining a correlation peak location;

(b) correlate the signal samples of the subranges with a reference pattern of quadrature symbol sync sequences for determining the symbol timing phase offset value; and (c) correlate each subrange of signal samples with the reference pattern of the quadrature symbol sync sequences for determining the symbol timing rate offset value.

13. The machine readable medium as recited in claim 12 wherein the instructions for correlating the signal samples for determining the symbol timing phase offset value further comprise instructions which, when executed by the processor, causes the processor to:

(a) calculate parameters of a line segment having a horizontal-axis zero-crossing using data values from the correlation of the signal samples of the subranges and the reference pattern of quadrature symbol sync sequences that includes the quadrature correlation data value corresponding to the correlation peak location in correlation step (a); and (b) estimate a horizontal distance from the smallest quadrature correlation data value to the horizontal-axis zero crossing for use as the symbol timing phase offset value.

14. The machine readable medium as recited in claim 12 wherein the instructions for correlating each subrange of signal samples for determining the symbol timing rate offset further comprise instructions which, when executed by the processor, causes the processor to model a rate offset from individual timing rate offsets for each subrange using a linear model.

15. The machine readable medium as recited in claim 14 wherein the instructions for modeling the rate offset further comprise instructions which, when executed by the processor, causes the processor to:

(a) determine weighting values of a least-squares fit linear model based on a number of segments in the block of signal samples; and (b) estimate the symbol timing rate offset value with a summation process using the weighting values and zero lag data values from each of the correlations of the subrange of signal samples with the quadrature sync symbol pattern.

16. The machine readable medium as recited in claim 10 wherein the instructions for calculating updated symbol timing phase and rate offset values further comprise instructions which, when executed by the processor, causes the processor to combine the current symbol timing phase and rate offset values with previous symbol timing phase and rate offset values.

17. The machine readable medium as recited in claim 10 wherein the instructions for generating symbol timing phase and rate offset values further comprise instructions which, when executed by the processor, causes the processor to:

a) determine incremental changes in the timing phase offset values and a count on the number of times the generating step is performed; and b) return the current calculated timing phase and rate offset values when the incremental changes are reduced to selected values or the generating step repetition count exceeds a selected value.

18. The machine readable medium as recited in claim 10 wherein the instructions for resampling the filtered signal samples further comprise instructions which, when executed by the processor, causes the processor to filter the signal samples of the subranges using a fractional-delay FIR filter derived from a Lagrange interpolating polynomial.

* * * * *